United States Patent
Zhao et al.

(10) Patent No.: US 10,021,561 B2
(45) Date of Patent: Jul. 10, 2018

(54) METHOD AND APPARATUS FOR SETTING UP COMMUNICATION CONNECTION

(71) Applicant: Huawei Technologies Co., Ltd., Shenzhen (CN)

(72) Inventors: Yuqing Zhao, Shenzhen (CN); Guangzhu Zeng, Shenzhen (CN); Meixin Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/925,724

(22) Filed: Oct. 28, 2015

(65) Prior Publication Data

US 2016/0050556 A1 Feb. 18, 2016

Related U.S. Application Data

(63) Continuation of application No. PCT/CN2014/077039, filed on May 8, 2014.

(30) Foreign Application Priority Data

May 8, 2013 (CN) .......................... 2013 1 0165692

(51) Int. Cl.
*H04W 8/20* (2009.01)
*H04W 48/18* (2009.01)
(Continued)

(52) U.S. Cl.
CPC .............. *H04W 8/20* (2013.01); *H04W 4/02* (2013.01); *H04W 48/18* (2013.01); *H04W 8/265* (2013.01)

(58) Field of Classification Search
CPC .......... H04W 8/20; H04W 4/02; H04W 48/18
(Continued)

(56) References Cited

U.S. PATENT DOCUMENTS 6,285,882 B1 9/2001 Cornillat et al.
2004/0023689 A1* 2/2004 Ahonen ................ H04W 12/04
455/558
(Continued)

FOREIGN PATENT DOCUMENTS

CN 1419394 A 5/2003
CN 1468024 A 1/2004
(Continued)

OTHER PUBLICATIONS

Master called signaling process, shadow 19890902, from https://wenku.baidu.com/view/ed35790c581b6bd97f19eae0.html?from=search. Mar. 11, 2012. total 6 pages. with partial English translation.

*Primary Examiner* — Kamran Afshar
*Assistant Examiner* — Nicole Louis-Fils
(74) *Attorney, Agent, or Firm* — Leydig, Voit & Mayer, Ltd.

(57) ABSTRACT

The present invention discloses a method and a relevant apparatus for achieving localized roaming of a mobile terminal. In the present invention, the mobile terminal sends real SIM card information to apply for a virtual SIM card to obtain a corresponding mobile terminal number of a roaming region, and registers user information to activate the virtual SIM card to serve as a calling party or a called party, so as to set up a called communication connection of a real SIM card. The mobile terminal applies for a virtual SIM card from a communication network of a roaming country to obtain a corresponding mobile terminal number of the roaming region through allocation, so that the user does not need to purchase a new SIM card in the roaming region, thereby saving the charges for purchasing the SIM card, ensuring a convenient operation and satisfying the demand of the user.

14 Claims, 8 Drawing Sheets

(51) Int. Cl.
*H04W 4/02* (2018.01)
*H04W 8/26* (2009.01)

(58) Field of Classification Search
USPC .................. 455/558, 418, 419, 432.1, 432.3
See application file for complete search history.

(56) References Cited

U.S. PATENT DOCUMENTS

| | | | |
|---|---|---|---|
| 2006/0089140 A1* | 4/2006 | Zhang | H04W 8/26 455/432.1 |
| 2006/0205404 A1 | 9/2006 | Gonen et al. | |
| 2010/0110890 A1* | 5/2010 | Rainer | H04M 15/00 370/232 |
| 2010/0311418 A1* | 12/2010 | Shi | H04W 4/003 455/432.1 |
| 2011/0028135 A1* | 2/2011 | Srinivasan | H04M 3/42382 455/415 |
| 2012/0040641 A1* | 2/2012 | Bennett | H04W 8/205 455/411 |
| 2013/0005316 A1* | 1/2013 | Bienn | H04W 4/16 455/417 |

FOREIGN PATENT DOCUMENTS

| | | |
|---|---|---|
| CN | 101212729 A | 7/2008 |
| CN | 101959182 A | 1/2011 |
| CN | 103716772 A | 4/2014 |

* cited by examiner

METHOD AND APPARATUS FOR SETTING UP COMMUNICATION CONNECTION

CROSS-REFERENCE TO RELATED APPLICATIONS

This application is a continuation of International Patent Application No. PCT/CN2014/077039, filed on May 8, 2014, which claims priority to Chinese Patent Application No. 201310165692.0, filed on May 8, 2013, both of which are hereby incorporated by reference in their entireties.

FIELD OF THE INVENTION

The present invention relates to the technical field of mobile communications, and in particular, to a method and a relevant apparatus for achieving localized roaming of a mobile terminal.

BACKGROUND OF THE INVENTION

A mobile communication system provides users with roaming capacity, and the users may achieve communication in different places and in different cellular network cells. In an existing roaming process of mobile terminals, a call of a mobile user in a roaming state needs a communication link to be set up through a mobile network of a home region and a roaming region, so that the mobile terminal user uses a variety of telecommunications services in the roaming state, for example, initiating a call, answering a call, etc. Since communication routing is longer in the roaming state, and more network resources are consumed, such that a charge for a roaming service is higher than a charge for a non-roaming state, and particularly when the user is in an international roaming state, any call must be finished by setting up a link through a mobile network of a home country and a mobile network of a roaming country. Therefore, the roaming user must pay an international call charge between the home country and the roaming country, and even if a call initiating parity and a roaming parity is in a same roaming region, both parties still need to pay the international call charge, such that the communication demand of the roaming user is inhibited due to an expensive charge.

In order to achieve localized roaming of mobile terminals to reduce roaming call charges, most of the roaming users purchase network operator prepaid SIM (subscriber identity module, subscriber identity module) cards in the roaming regions, and the roaming SIM cards are only used as a called party generally, to avoid missing calls or short messages. However, a new SIM card needs to be applied for in a network operator business hall in a roaming region, the use manner is very inconvenient for a user; moreover, after the new SIM card is purchased, the SIM card of the roaming region may be used only if the user has a mobile terminal which support a dual-card dual-standby function or purchase a new mobile terminal, thus increasing the correlative charges paid by the user.

SUMMARY OF THE INVENTION

Embodiments of the present invention provide a method and a relevant apparatus and system for achieving localized roaming of a mobile terminal, in order to achieve the localized roaming of the mobile terminal to save a roaming call charge and meet a practical consumption demand of a user.

A first aspect of the present invention provides a method for achieving localized roaming of a mobile terminal, including:
  sending real SIM card information to apply for a virtual SIM card to obtain a corresponding mobile terminal number of a roaming region;
  registering user information to activate the virtual SIM card to serve as a calling party or a called party; and
  setting up a called communication connection of a real SIM card.

In combination with an implementation manner of the first aspect, in a first possible implementation manner, before the sending real SIM card information to apply for a virtual SIM card to obtain a corresponding mobile terminal number of a roaming region, the method includes: downloading and installing virtual SIM card management software.

In combination with the implementation manner of the first aspect, in a second possible implementation manner, the sending real SIM card information to apply for a virtual SIM card to obtain a corresponding mobile terminal number of a roaming region includes:
  setting up a communication connection with a virtual SIM card server of a communication network of a roaming country;
  sending application information carrying the real SIM card information to obtain the virtual SIM card from the virtual SIM card server;
  receiving applicant identity verification of the virtual SIM card server;
  obtaining a corresponding virtual SIM card; and
  storing information of the virtual SIM card.

In combination with the implementation manner of the first aspect, in a third possible implementation manner, the registering user information to activate the virtual SIM card to serve as a calling party or a called party includes:
  activating the virtual SIM card and closing roaming information of the real SIM card of the mobile terminal, to enable a visit location register of the roaming region to obtain virtual SIM card information and the real SIM card information of the mobile terminal from a virtual SIM card server, wherein location information and state information of the real SIM card is sent according to the real SIM card information of the mobile terminal to a home location register, which stores the location information and the state information of the real SIM card; and
  setting calling and data services of the mobile terminal to use the virtual SIM card.

In combination with the first aspect or the first possibility of the first aspect, in a fourth possible implementation manner, after the registering user information to activate the virtual SIM card to serve as a calling party or a called party, the method includes: setting up a calling or called communication connection of the virtual SIM card.

In combination with the implementation manner of the first aspect, in a fifth possible implementation manner, the setting up a called communication connection of a real SIM card includes:
  receiving, by the mobile terminal, a call request of a visit location register through a base station;
  sending, by the mobile terminal, a corresponding call confirmation message to a mobile switching center through the base station;
  receiving, by the mobile terminal, an assignment request message sent by the mobile switching center through the base station;

sending, by the mobile terminal, an assignment completion message and a ringing message to the mobile switching center through the base station, for enabling the mobile switching center to send an address complete message to a mobile switching center where the calling party is located, wherein the ringing message is sent by the mobile switching center where the calling party is located to a mobile terminal of the calling party;

sending, by the mobile terminal, a connection message to the mobile switching center through the base station, for enabling the mobile switching center to send an answer message to the mobile switching center where the calling party is located, wherein a connection setup request message is sent by the mobile switching center where the calling party is located to the mobile terminal of the calling party, and a connection confirmation message is sent by the mobile terminal of the calling party to the mobile switching center where the called party is located through the mobile switching center where the calling party is located; and receiving, by the mobile terminal, the connection confirmation message through the base station, and setting up the called communication connection of the real SIM card with the mobile terminal of the calling party.

In combination with the implementation manner of the first aspect, in a sixth possible implementation manner, an existing form of the virtual SIM card may be used as a part of the real SIM card in the mobile terminal, or is used as a data file to be directly stored in an external memory of the mobile terminal.

In combination with the first aspect or the fifth possibility of the first aspect, in a seventh possible implementation manner, when the real SIM card is in a called state, a roaming call identifier is displayed on the mobile terminal.

In combination with the implementation manner of the first aspect, in an eighth possible implementation manner, if the mobile terminal leaves the roaming region, the mobile terminal number of the roaming region of a roaming country occupied by the mobile terminal is released, and a corresponding relationship between the mobile terminal number of the roaming region and a user is terminated.

A second aspect of the present invention provides a mobile terminal, including:
a virtual SIM card application module, configured to send real SIM card information to apply for a virtual SIM card to obtain a corresponding mobile terminal number of a roaming region;
a virtual SIM card management module, configured to register user information to activate the virtual SIM card to serve as a calling party or a called party; and
a communication module, configured to set up a called communication connection of a real SIM card.

In combination with the implementation manner of the second aspect, in a first possible implementation manner, the mobile terminal further includes: a downloading module, configured to download and install virtual SIM card management software.

In combination with the implementation manner of the second aspect, in a second possible implementation manner, the communication module is further configured to set up a calling or called communication connection of the virtual SIM card.

In combination with the implementation manner of the second aspect, in a third possible implementation manner, the virtual SIM card application module is further configured to:

set up a communication connection with a virtual SIM card server of a communication network of a roaming country;
send application information carrying the real SIM card information to obtain the virtual SIM card from the virtual SIM card server;
receive applicant identity verification of the virtual SIM card server;
obtain a corresponding virtual SIM card; and
store information of the virtual SIM card.

In combination with the implementation manner of the second aspect, in a fourth possible implementation manner, the virtual SIM card management module is further configured to:
activate the virtual SIM card and close roaming information of the real SIM card of the mobile terminal, to enable a visit location register of the roaming region to obtain virtual SIM card information and the real SIM card information of the mobile terminal from a virtual SIM card server, wherein location information and state information of the real SIM card is sent by the visit location register according to the real SIM card information of the mobile terminal to a home location register, which stores the location information and the state information of the real SIM card; and
set calling and data services of the mobile terminal to use the virtual SIM card.

In combination with the implementation manner of the second aspect, in a fifth possible implementation manner, an existing form of the virtual SIM card may be used as a part of the real SIM card in the mobile terminal, or is used as a data file to be directly stored in an external memory of the mobile terminal.

In combination with the implementation manner of the second aspect, in a sixth possible implementation manner, when the real SIM card is in a called state, a roaming call identifier is displayed on the mobile terminal.

In combination with the implementation manner of the second aspect, in a seventh possible implementation manner, if the mobile terminal leaves the roaming region, the mobile terminal number of the roaming region of a roaming country occupied by the mobile terminal is released, and a corresponding relationship between the mobile terminal number of the roaming region and a user is terminated.

A third aspect of the present invention provides a mobile terminal, including: an inputting apparatus, an outputting apparatus, a memory and a processor, wherein the inputting apparatus, the outputting apparatus, the memory and the processor are connected,
wherein the processor executes the following steps:
sending real SIM card information to apply for a virtual SIM card to obtain a corresponding mobile terminal number of a roaming region;
registering user information to activate the virtual SIM card to serve as a calling party or a called party; and
setting up a called communication connection of a real SIM card.

In combination with the implementation manner of the third aspect, in a first possible implementation manner, the processor further executes the following step: downloading and installing virtual SIM card management software.

In combination with the implementation manner of the third aspect, in a second possible implementation manner, when executing the step of sending real SIM card information to apply for a virtual SIM card to obtain a corresponding mobile terminal number of a roaming region, the processor specifically executes the following steps:

setting up a communication connection with a virtual SIM card server of a communication network of a roaming country;

sending application information carrying the real SIM card information to obtain the virtual SIM card from the virtual SIM card server;

receiving applicant identity verification of the virtual SIM card server;

obtaining a corresponding virtual SIM card; and storing information of the virtual SIM card.

In combination with the implementation manner of the third aspect, in a third possible implementation manner, when executing the step of registering user information to activate the virtual SIM card to serve as a calling party or a called party, the processor specifically executes the following steps:

activating the virtual SIM card and closing roaming information of the real SIM card of the mobile terminal, to enable a visit location register of the roaming region to obtain virtual SIM card information and the real SIM card information of the mobile terminal from virtual SIM card server, wherein location information and state information of the real SIM card is sent by the visit location register according to the real SIM card information of the mobile terminal to a home location register, which stores the location information and the state information of the real SIM card; and setting calling and data services of the mobile terminal to use the virtual SIM card.

In combination with the implementation manner of the third aspect, in a fourth possible implementation manner, the processor further executes the following step: setting up a calling or called communication connection of the virtual SIM card.

In combination with the implementation manner of the third aspect, in a fifth possible implementation manner, an existing form of the virtual SIM card may be used as a part of the real SIM card in the mobile terminal, or is used as a data file to be directly stored in an external memory of the mobile terminal.

In combination with the implementation manner of the third aspect, in a sixth possible implementation manner, when the real SIM card is in a called state, a roaming call identifier is displayed on the mobile terminal.

In combination with the implementation manner of the third aspect, in a seventh possible implementation manner, if the mobile terminal leaves the roaming region, the mobile terminal number of the roaming region of a roaming country occupied by the mobile terminal is released, and a corresponding relationship between the mobile terminal number of the roaming region and a user is terminated.

It can be seen that, in some feasible implementation manners of the present invention, the mobile terminal applies for a virtual SIM card from the communication network of the roaming country to be allocated and obtain a corresponding mobile terminal number of the roaming region, and then registers the user information in the roaming country to activate the virtual SIM card, so that the virtual SIM card is in a calling or called state. Therefore, the user does not need to purchase a new SIM card in the roaming region, thereby saving the charges for purchasing the SIM card, facilitating operation and satisfying the demand of the user. In addition, the mobile terminal updates location information of a home country SIM card to the home country so as to keep the home country SIM card in a called state. Therefore, when the real SIM card receives a called request, a roaming call identifier will be displayed on the mobile terminal to prompt the user that the called request belongs to a roaming call and roaming charges need to be paid, and then the user selects whether to answer the called request according to demand, so as to reduce the roaming call charges without missing calls or short messages.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF THE EMBODIMENTS

Figure 1:
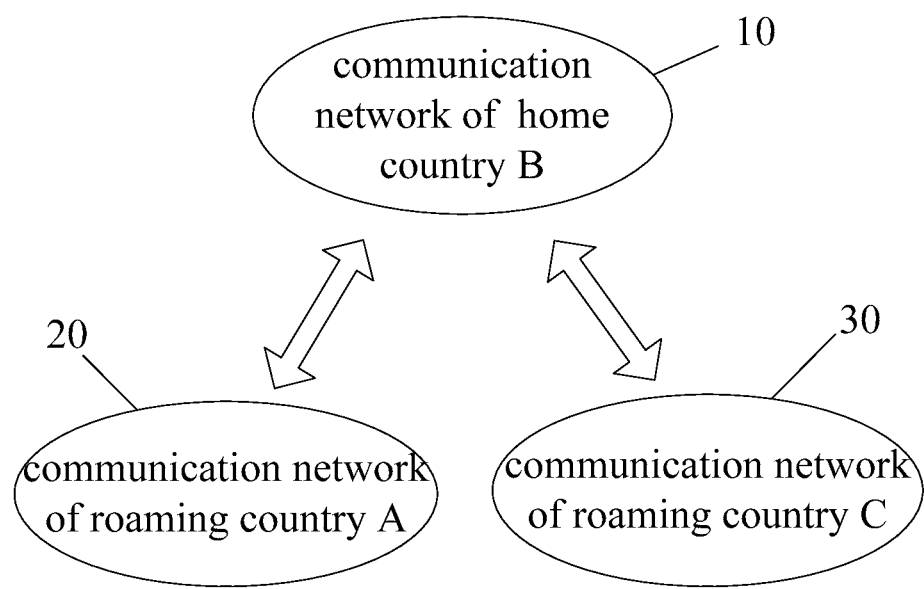
FIG. 1 is a schematic diagram of an application environment provided by an embodiment of the present invention.

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

In the present invention, localized roaming refers to that a mobile terminal of a user obtains a number of a roaming region during roaming and initiates and receives calls by using this number, such that the user may enjoy local services just like a local user at the roaming region, avoiding unnecessary speech path detour and thus reducing roaming communication charges. The present invention will be illustrated with international roaming as an example. When the method for achieving localized roaming of a mobile terminal provided by the present invention is adopted, the user applies for a corresponding virtual SIM card from a network operator of the roaming region, and the virtual SIM card stores an international mobile subscriber identification number (international mobile subscriber identification number, IMSI), an authentication key (KI), a location area identity (location area identity, LAI), a temporary mobile subscriber identity (temporary mobile subscriber identity, TMSI), a personal identification number (personal identification number, PIN), a PIN unlocking key (PIN unlocking key, PUK) and a mobile terminal number of the roaming region, etc. The mobile terminal number of the roaming region is a mobile terminal number of the roaming region automatically allocated to the mobile terminal by the network operator of a roaming country according to the application from the user and an area where the mobile terminal of the user is roaming, and the allocated mobile terminal number is notified to the mobile terminal user.

In embodiments of the present invention, an existing form of the virtual SIM card may be a part of a real SIM card in the mobile terminal (namely, the virtual SIM card may be registered in the real SIM card), or is used as a data file to be directly stored in an external memory (for example, an SD card of the mobile terminal). The virtual SIM card may directly call a mobile terminal function program matched with it to integrate with the functions of the real SIM card and may independently run the functions of the real SIM card, for example, standby, calling and being called, and when a user leaves a roaming region, a mobile terminal number temporarily allocated to the user is withdrawn and deactivated. When the user is in the roaming region, the user uses the mobile terminal number of the roaming region of the virtual SIM card to initiate a call or be called (namely answer a call) to enjoy localized roaming services. Taking it as an example that a country is used as a roaming area, by adopting the present invention, no international call charge needs to be paid for answering calls in a roaming country, so that the communication charges during the user roams are reduced.

Figure 2:
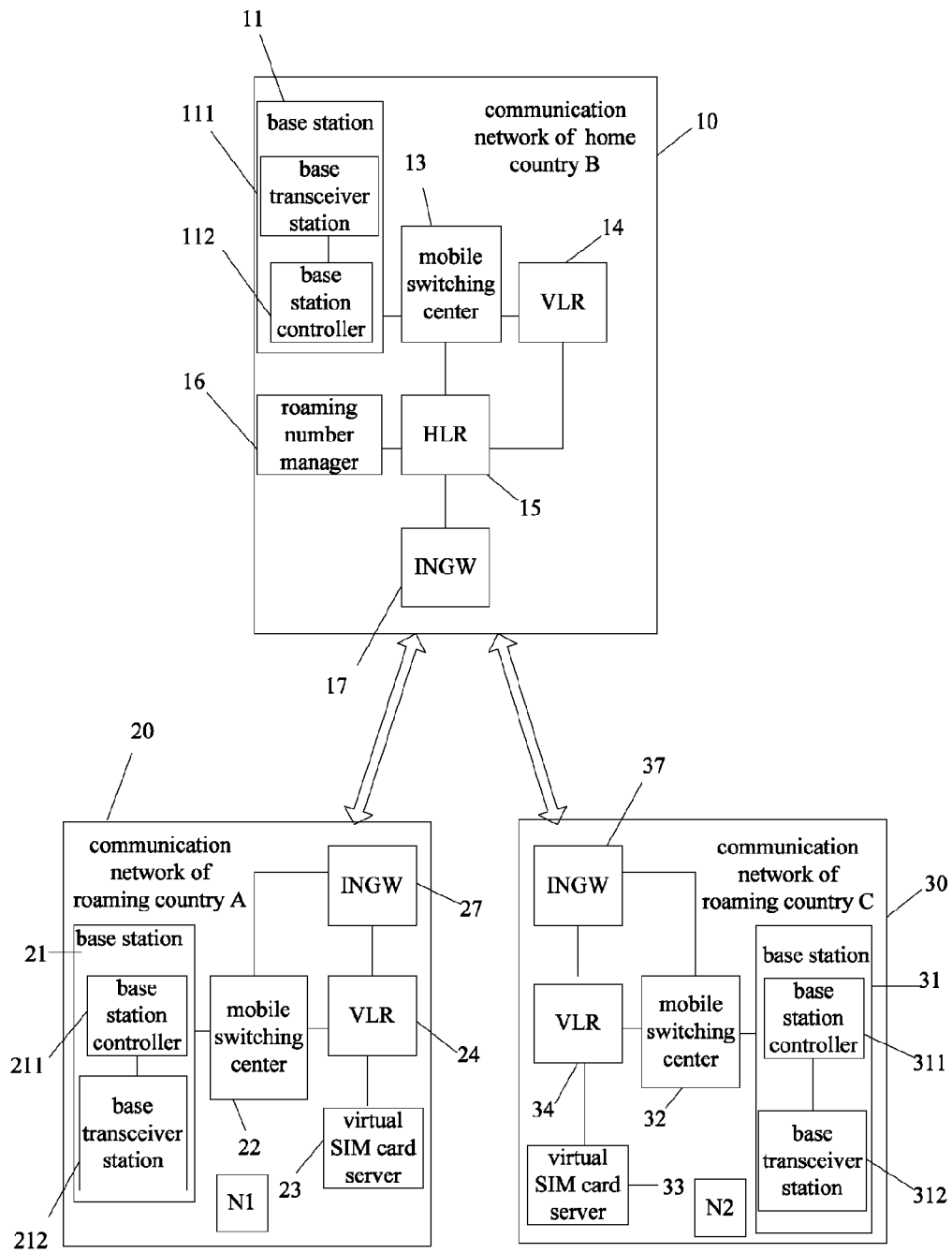
FIG. 2 is a specific schematic diagram of the application environment provided by FIG. 1.

Referring to FIG. 1 and FIG. 2, they are schematic diagrams of an application environment provided by an embodiment of the present invention. As shown in FIG. 1, three networks are illustrated in the figure, namely, a communication network 10 of a home country B, a communication network 20 of a roaming country A and a communication network 30 of a roaming country C. In the embodiment of the present invention, the communication networks 10, 20 and 30 may be public land mobile networks (public land mobile network, PLMN), and an entity reference diagram of the communication networks in the present invention is illustrated by taking the communication network 10 of the home country B as an example. The communication network 10 includes a base station 11, a mobile switching center (MSC) 13, a visit location register (VLR) 14, a home location register (HLR) 15, a roaming number manager (RNM) 16 connected with the home location register 15 and an international gateway (INGW) 17 connected with the home location register 15. In the embodiment of the present invention, the visit location register 14 may be a visit location register of a home operator (home visit location register, H-VLR), and the home location register 15 may be a location register of the home operator (home home location register, H-HLR).

In the communication network as shown in FIG. 2, the base station 11 includes a base transceiver station (base transceiver station, BTS) 111 and a base station controller (base station controller, BSC) 112, and the base transceiver station 111 is used for receiving or sending wireless signals, serves a certain area and sets up a wireless connection with a user in the area. The base station controller 112 is connected with the base transceiver station 111, is used for managing wireless resources and controlling an action of the base transceiver station 111, and is also used as a connecting point between the base transceiver station 111 and the mobile switching center 13 to provide an interface for exchanging information therebetween.

The mobile switching center 13 is connected with the base station controller 112 and is used for controlling a mobile call process. The visit location register 14 is connected with the mobile switching center 13 and is used for storing data of the mobile terminal user roaming to a coverage area thereof, including the mobile terminal number of the roaming region allocated to the mobile terminal of the user.

The home location register 15 is connected with the mobile switching center 13 and the visit location register 14 and is used as a mobile user management database for storing parameters of the mobile terminal user and information about current location of the mobile terminal user. The international gateway 17 is connected with the home location register 15 and is used for inquiring and obtaining the current location information of the called mobile terminal from the home location register 15, selecting routing according to the information and routing a call to an international gateway of a corresponding operator.

The roaming number manager 16 is connected with the home location register 15 and is used for storing and managing the mobile terminal numbers of the home country and the roaming country and a corresponding relationship between the mobile terminal number and the user. The roaming number manager 16 is further used for recycling the mobile terminal number of the roaming country of the user. For example, when the mobile terminal user leaves the roaming country and registers the location in another country, the home location register 15 of the home country notifies the roaming number manager 16 that the location of the user is updated, then the roaming number manager 16 releases the mobile terminal number of the roaming country occupied by the user and terminates the corresponding relationship between the number and the user.

The communication network 20 of the roaming country A includes a base station 21, a mobile switching center 22, a virtual SIM card server 23, a visit location register (VLR) 24 and an international gateway (INGW) 27, and the base station 21 includes a base transceiver station 211 and a base station controller 212. The communication network 30 of the roaming country C also includes a base station 31, a mobile switching center 32, a virtual SIM card server 33, a visit location register (VLR) 34 and an international gateway (INGW) 37, and the base station 31 includes a base transceiver station 311 and a base station controller 312. The virtual SIM card servers 23 and 33 are provided with virtual SIM card databases, may respond to a request of the mobile terminal user for the virtual SIM card to issue and manage the virtual SIM card for the mobile terminal user, and may provide a safe and reliable manner to issue the virtual SIM card to the mobile terminal user.

In the embodiment of the present invention, the base stations 21 and 31, the mobile switching centers 22 and 32, the visit location registers 24 and 34 and the international gateways 27 and 37 respectively have the same principles and functions as the base station 11, the mobile switching center 13, the visit location register 14 and the international gateway 17 in the communication network 10 of the home country B, which will not be repeated redundantly herein. The visit location registers 24 and 34 may be visit location registers of a visiting location operator (visit visit location register, V-VLR).

Figure 3:
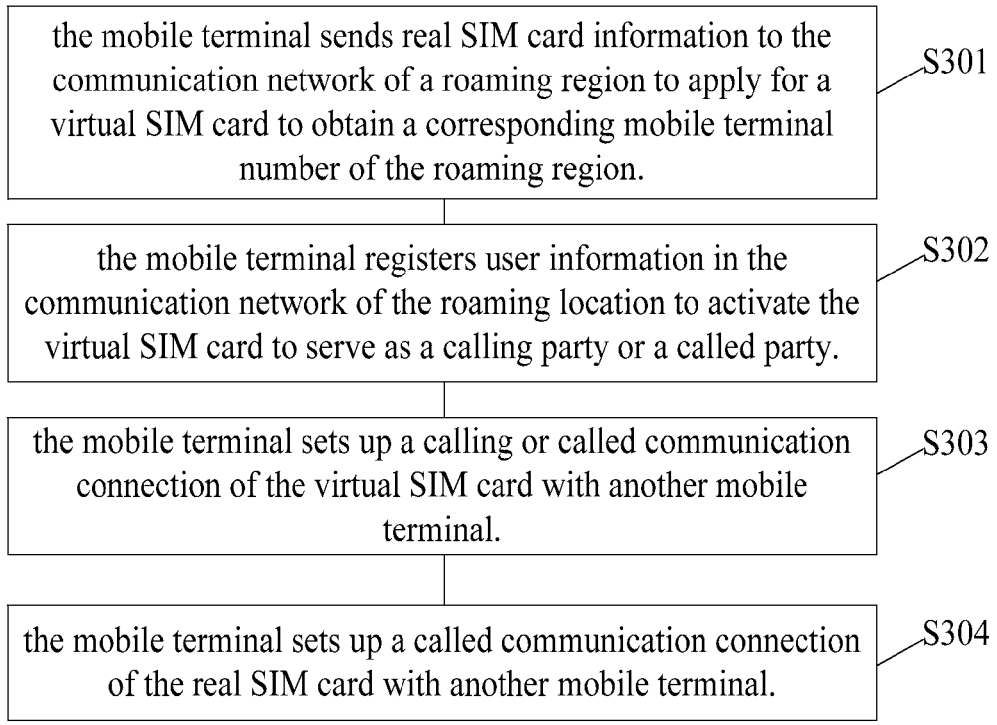
FIG. 3 is a schematic diagram of a flow of a method for achieving localized roaming of a mobile terminal provided by the first embodiment of the present invention.

Referring to FIG. 3 and in combination with the schematic diagrams of the application environment in FIG. 1 and FIG. 2, FIG. 3 is a schematic diagram of a flow of a method for achieving localized roaming of a mobile terminal provided by the first embodiment of the present invention. Mobile terminals N1 and N2 as shown in FIG. 2 are mobile terminal users of the home country B, and it is assumed that both the mobile terminal users respectively roam to the roaming country A and the roaming country C. Both of the mobile terminals N1 and N2 may be used as calling parties or called parties, each mobile terminal user may apply for a corresponding virtual SIM card from a network operator of a roaming country and is allocated with a mobile terminal number of the roaming country, and the embodiment of the present invention is illustrated by taking it as an example that the mobile terminal N1 applies for a virtual SIM card from the roaming country A to achieve the localized roaming of the mobile terminal.

The method for achieving the localized roaming of the mobile terminal at least includes the following steps.

S301. the mobile terminal sends real SIM card information to a communication network of a roaming region to apply for a virtual SIM card to obtain a corresponding mobile terminal number of a roaming region.

In the embodiment of the present invention, after registering in the roaming country A and normally accessing a network, the mobile terminal N1 applies for a corresponding virtual SIM card from a network operator of the roaming country A. An existing form of the virtual SIM card may be a part of a real SIM card in the mobile terminal (namely, the virtual SIM card may be registered in the real SIM card), or is used as a data file to be directly stored in an external memory of the mobile terminal (for example, an SD card of the mobile terminal). The virtual SIM card stores an international mobile subscriber identification number (IMSI), an authentication key (KI), a location area identity (LAI), a temporary mobile subscriber identity (TMSI), a personal identification number (PIN), a PIN unlocking key (PUK) and the mobile terminal number of the roaming region, etc., wherein the mobile terminal number of the roaming region is a mobile terminal number of the roaming region automatically allocated to the mobile terminal N1 by the network operator of the roaming country according to the application from the user and the roaming area of the mobile terminal N1 of the user, and the allocated mobile terminal number is notified to the mobile terminal user.

S302. the mobile terminal registers user information in the communication network of the roaming region to activate the virtual SIM card to serve as a calling party or a called party.

In the embodiment of the present invention, the mobile terminal N1 registers the user information of the mobile terminal N1 in the network operator of the roaming country A, and after the authentication of the individual information of the mobile terminal user is passed, the virtual SIM card is activated. At this time, the virtual SIM card may be used as the calling party or the called party, the real SIM card is not activated, the mobile terminal N1 displays no roaming information, and the real SIM card is in a standby state and will not initiate a call. The registration information of the mobile terminal N1 not only provides virtual SIM card information, but also may carry real SIM card information. In a process of activating the virtual SIM card in the communication network 20 of the roaming country A, the mobile terminal N1 loads the carried real SIM card information in the communication network 20 of the roaming country A at the same time, and the communication network 20 of the roaming country A stores updated location information of the mobile terminal N1 and sends the updated location information to the communication network 10 of the home country B of the mobile terminal N1.

S303. the mobile terminal sets up a calling or called communication connection of the virtual SIM card with another mobile terminal.

In the embodiment of the present invention, the virtual SIM card of the mobile terminal N1 has been activated and may be used as a calling party or a called party to set up a communication connection with other mobile terminals (including a local mobile terminal and a remote mobile terminal) through the communication network. Since the virtual SIM card carries a corresponding mobile terminal number of the roaming region, the mobile terminal N1 will not display a roaming call identifier no matter serving as the calling party or the called party. Due to the virtual SIM card obtained on the basis of the application, the user does not need to purchase a new SIM card in the roaming region, so that the charges for purchasing the SIM card are saved.

S304. the mobile terminal sets up a called communication connection of the real SIM card with another mobile terminal.

In the embodiment of the present invention, the real SIM card of the mobile terminal N1 is not activated and is in a standby called state, namely, the real SIM card will not initiate a call. When the mobile terminal N1 is used as a called party to set up the communication connection with another mobile terminal, a roaming call identifier will be displayed on the mobile terminal N1 to prompt the user that the called action belongs to a roaming call and roaming charges need to be paid, and then the user selects whether to answer the called request according to demand.

In the method for achieving the localized roaming of the mobile terminal provided by the embodiment of the present invention, the mobile terminal applies for a virtual SIM card from the communication network of the roaming country to be allocated and obtain a corresponding mobile terminal number of the roaming region, and then registers user information in the roaming country to activate the virtual SIM card, so as to keep the virtual SIM card in a calling or called state. Therefore, the user does not need to purchase a new SIM card in the roaming region, thereby saving the charges for purchasing the SIM card, facilitating operation and satisfying the demand of the user. In addition, the mobile terminal sends and updates location information of a home country real SIM card to the home country so as to keep the home country real SIM card in a called state. Therefore, when the real SIM card receives a called request, a roaming call identifier will be displayed on the mobile terminal to prompt the user that the called request belongs to a roaming call and roaming charges need to be paid, and then the user selects whether to answer the called request according to demand, so as to reduce the roaming call charges without missing calls or short messages.

Figure 4:
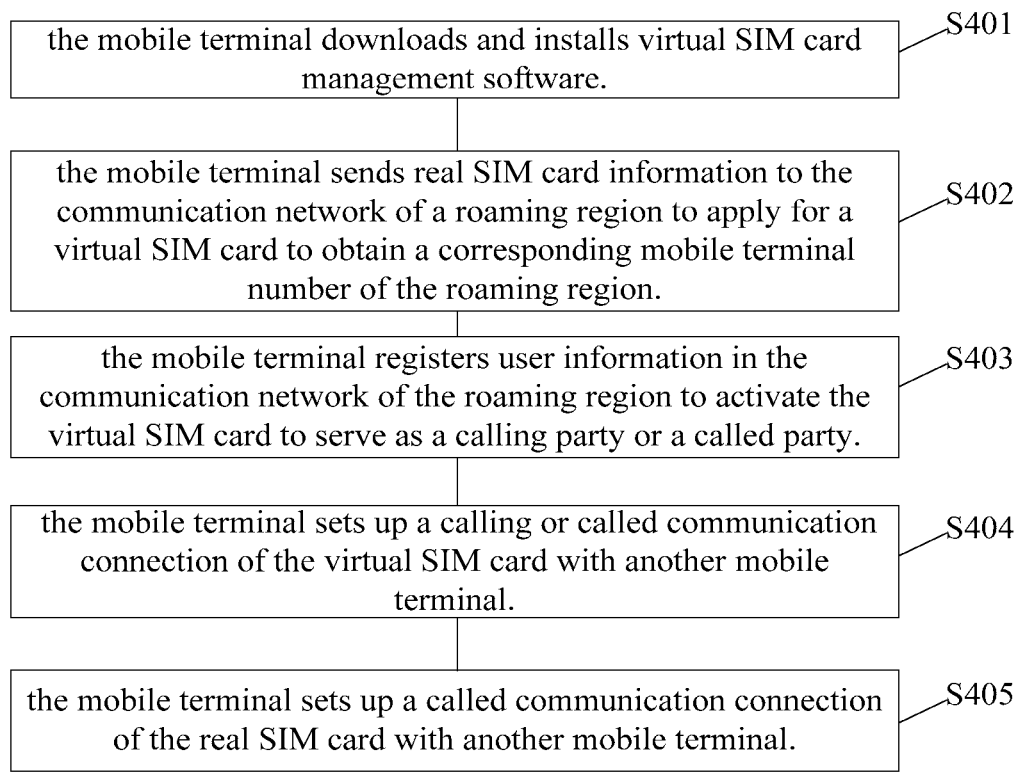
FIG. 4 is a schematic diagram of a flow of a method for achieving localized roaming of a mobile terminal provided by the second embodiment of the present invention.

Referring to FIG. 4, and in combination with the schematic diagrams of the application environment in FIG. 1 and FIG. 2, FIG. 4 is a schematic diagram of a flow of a method for achieving localized roaming of a mobile terminal provided by the second embodiment of the present invention. It is assumed that mobile terminals N1 and N2 as shown in FIG. 2 are mobile terminal users of a home country B, and both the mobile terminal users respectively roam in a roaming country A and a roaming country C. Both of the mobile terminals N1 and N2 may be used as calling parties or called parties, each of the mobile terminal users may apply for a corresponding virtual SIM card from a network operator of a roaming country and is allocated with a mobile terminal number of the roaming country, and the embodiment of the present invention is illustrated by taking it as an example that the mobile terminal N1 applies for a virtual SIM card from the roaming country A and communicates with the mobile terminal N2 in the roaming country C to achieve the localized roaming of the mobile terminal.

The method for achieving the localized roaming of the mobile terminal at least includes the following steps.

S401. the mobile terminal downloads and installs virtual SIM card management software.

In the embodiment of the present invention, after registering in the roaming country A and normally accessing the network, the mobile terminal N1 downloads (may be achieved in a free or paid manner) the virtual SIM card management software from for example an operator website in the communication network 20 of the roaming country A, and installs the virtual SIM card management software on the mobile terminal N1 according to prompt information. The virtual SIM card management software may be downloaded and installed in the real SIM card as an application program, or is directly used as a data file to be stored in an external memory of the mobile terminal N1 (for example, an SD card of the mobile terminal N1).

S402. the mobile terminal sends real SIM card information to the communication network of a roaming region to apply for a virtual SIM card to obtain a corresponding mobile terminal number of the roaming region.

In the embodiment of the present invention, after registering in the roaming country A and normally accessing the network, the mobile terminal N1 applies for the corresponding virtual SIM card from the virtual SIM card server 23 of the roaming country A through the virtual SIM card management software, and the virtual SIM card management software executes relevant operation and management of the virtual SIM card, for example, downloading, activation, suspension, etc. An existing form of the virtual SIM card may be a part of a real SIM card in the mobile terminal (namely, the virtual SIM card may be registered in the real SIM card), or is used as a data file to be directly stored in the external memory of the mobile terminal N1 (for example, the SD card of the mobile terminal N1). The virtual SIM card stores an international mobile subscriber identification number (IMSI), an authentication key (KI), a location area identity (LAI), a temporary mobile subscriber identity (TMSI), a personal identification number (PIN), a PIN unlocking key (PUK) and the mobile terminal number of the roaming region, etc., wherein the mobile terminal number of the roaming region is a mobile terminal number of the roaming region automatically allocated to the mobile terminal by a network operator of the roaming country according to the application from the user and a roaming area of the mobile terminal of the user, and the allocated mobile terminal number is notified to the mobile terminal user.

Figure 5:
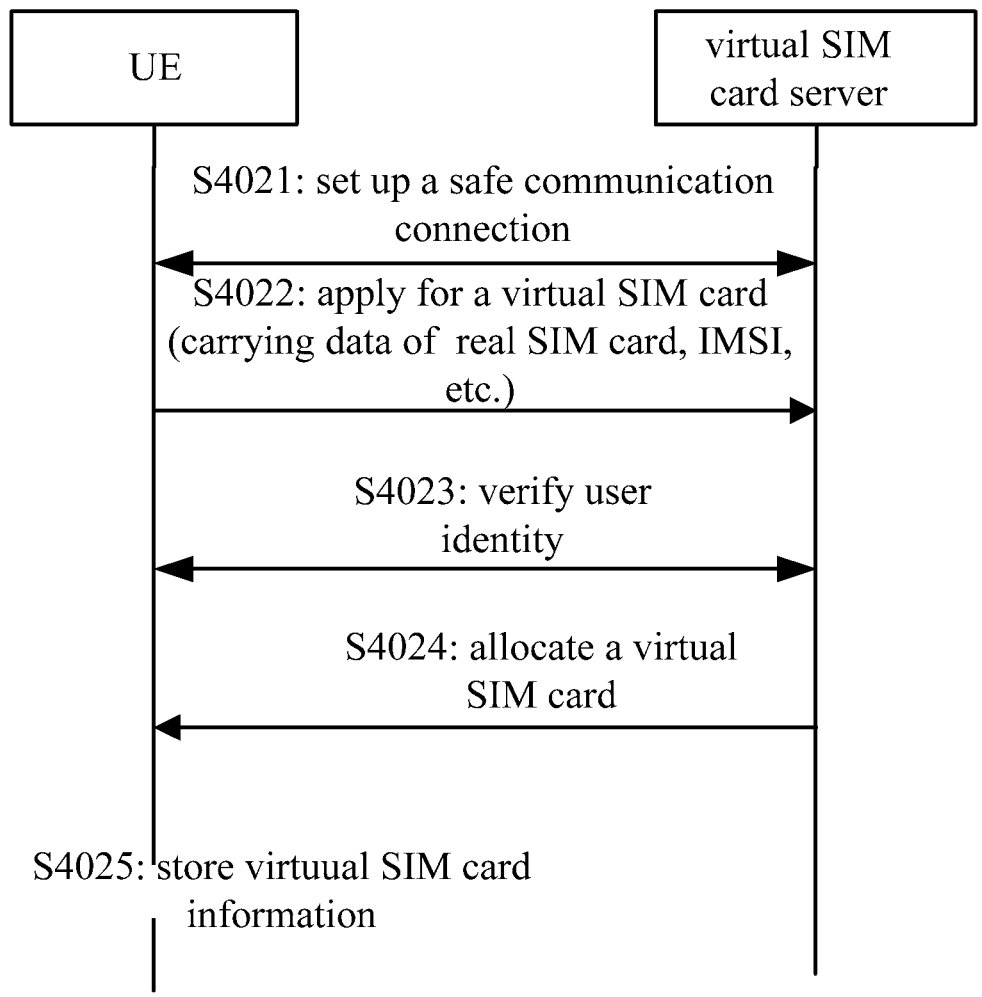
FIG. 5 is a schematic diagram of a sub-flow of a step S402 in FIG. 4.

Further referring to FIG. 5, the step in which the mobile terminal sends real SIM card information to the communication network of the roaming region to apply for the virtual SIM card to obtain the corresponding mobile terminal number of the roaming region at least includes:

S4021. the mobile terminal sets up a communication connection with a virtual SIM card server of the communication network of the roaming country; specifically, the mobile terminal N1 normally accesses the network in the roaming country A, accesses the virtual SIM card server 23 through the virtual SIM card management software and sets up the communication connection with the virtual SIM card server 23, and the connection security of both parties herein is guaranteed by the virtual SIM card management software and the virtual SIM card server 23;

S4022. the mobile terminal sends application information carrying the real SIM card information to apply for and obtain the virtual SIM card from the virtual SIM card server; specifically, the mobile terminal N1 accesses the virtual SIM card server 23 through the virtual SIM card management software in the roaming country A and sends application information to the virtual SIM card server 23 to apply for a virtual SIM card applicable to the roaming country A for the mobile terminal N1; the application information sent to the virtual SIM card server 23 carries the real SIM card information, IMSI information and the like of the mobile terminal N1, and by means of the operation, the virtual SIM card server 23 obtains the real SIM card information, such that both the virtual SIM card information and the real SIM card information are in the virtual SIM card server 23;

S4023. the mobile terminal receives applicant identity verification of the virtual SIM card server; specifically, the mobile terminal N1 sends the real SIM card information to the virtual SIM card server 23 and stores the real SIM card information in the virtual SIM card server 23, and the mobile terminal N1 may pass the identity verification after being authenticated by the virtual SIM card server 23;

S4024. the mobile terminal obtains a corresponding virtual SIM card; specifically, after the real SIM card information of the mobile terminal N1 passes the identity authentication and verification of the virtual SIM card server 23 of the roaming country A, the virtual SIM card server 23 allocates a corresponding virtual SIM card to the mobile terminal N1; an existing form of the virtual SIM card may be a part of the real SIM card in the mobile terminal (namely, the virtual SIM card may be registered in the real SIM card), or is used as a data file to be directly stored in the external memory of the mobile terminal N1 (for example, the SD card of the mobile terminal N1); the virtual SIM card stores an international mobile subscriber identification number (IMSI), an authentication key (KO, a location area identity (LAI), a temporary mobile subscriber identity (TMSI), a personal identification number (PIN), a PIN unlocking key (PUK) and the mobile terminal number of the roaming region, etc;

S4025. the mobile terminal stores the virtual SIM card information; specifically, the mobile terminal N1 obtains the virtual SIM card allocated by the virtual SIM card server 23 and stores the virtual SIM card information. Therefore, the roaming region number carried in the virtual SIM card may be in a calling state or a called state, the mobile terminal user does not need to purchase a new real SIM card at the roaming region, and moreover the roaming call charges are saved.

S403. the mobile terminal registers user information in the communication network of the roaming region to activate the virtual SIM card to serve as a calling party or a called party.

In the embodiment of the present invention, the mobile terminal N1 registers the user information of the mobile terminal N1 in the network operator of the roaming country A according to an interface prompt of the virtual SIM card management software (for example, a corresponding virtual function key is set on the interface of the virtual SIM card management software on the mobile terminal N1), and after the authentication of the individual information of the mobile terminal user is passed, the virtual SIM card is activated. At this time, the virtual SIM card may be used as the calling party or the called party, the real SIM card is not activated, the mobile terminal N1 displays no roaming information, and the real SIM card is in a standby state and will not initiate a call. The user information registered by the mobile terminal N1 may only provide the virtual SIM card information and may also carry the real SIM card information.

Figure 6:
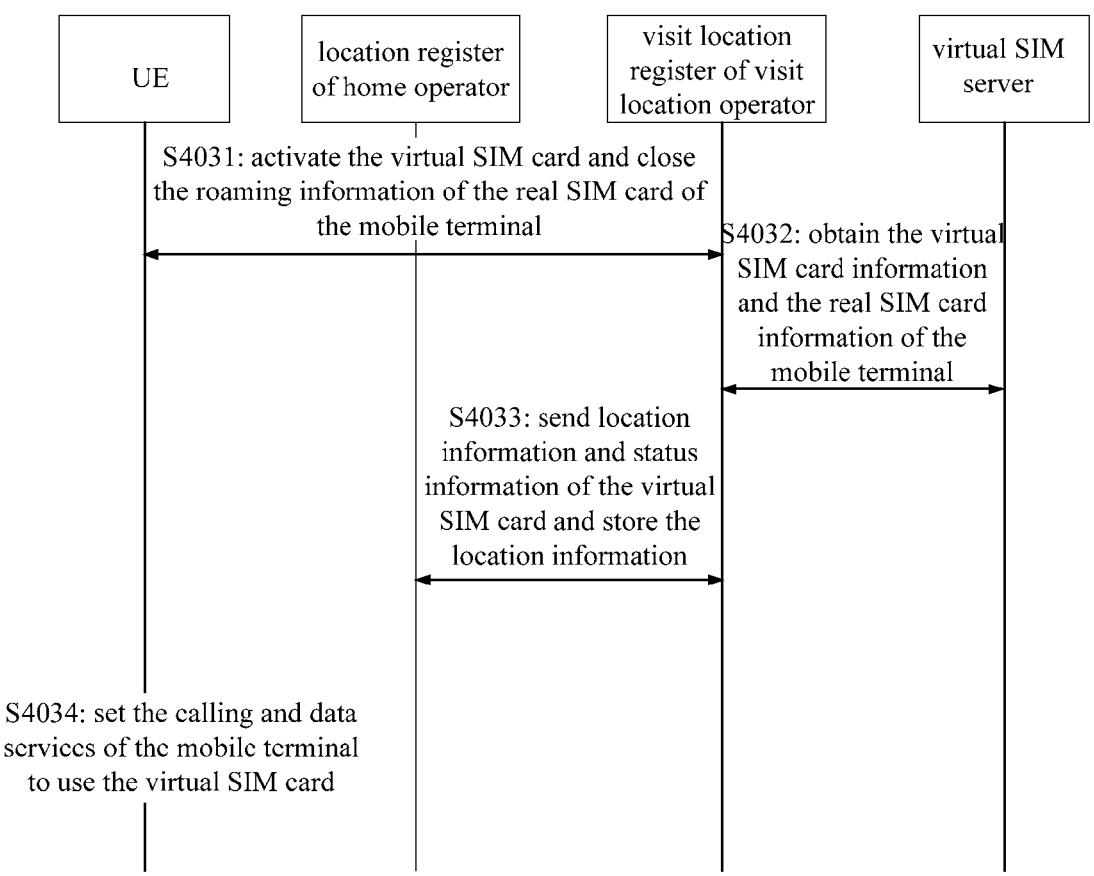
FIG. 6 is a schematic diagram of a sub-flow of a step S403 in FIG. 4.

Further referring to FIG. 6, the step in which the mobile terminal registers user information in the communication network of the roaming region to activate the virtual SIM card to serve as a calling party or a called party at least includes:

S4031. the user information is registered to activate the virtual SIM card and the roaming information of the real SIM card of the mobile terminal is closed; specifically, the mobile terminal N1 registers the user information of the mobile terminal N1 in the visit location register 24 of the communication network 20 of the roaming country A according to the interface prompt of the virtual SIM card management software to activate the virtual SIM card. At this time, the virtual SIM card may be used as the calling party or the called party, the real SIM card is not activated, and thus the mobile terminal N1 displays no roaming information, and the real SIM card is in a standby state and will not initiate a call;

S4032. the virtual SIM card information and the real SIM card information of the mobile terminal are obtained; specifically, the visit location register 24 sends a request for inquiring the user data of the mobile terminal N1 to the virtual SIM card server 23 of the communication network 20 of the roaming country A according to the registration request of the mobile terminal N1, in order to obtain response information of the virtual SIM card server 23, and the response information includes the virtual SIM card information and the real SIM card information of the mobile terminal N1; in the embodiment of the present invention, the registration information of the mobile terminal N1 may only provide the virtual SIM card information and may also carry the real SIM card information, and the virtual SIM card information and the real SIM card information need to be provided in the response information of the virtual SIM card server 23 simultaneously;

S4033. location information and state information of the real SIM card are sent to a home location register of a home region of the mobile terminal, and the location information is updated and stored; specifically, the visit location register 24 sends the real SIM card information of the mobile terminal N1 (including the current location information and the current state information of the mobile terminal N1) to the international gateway 17 of the home country B through the international gateway 27, and the international gateway 17 of the home country B sends the current location information and state information of the mobile terminal N1 to the home location register 15. The home location register 15 determines that the location of the mobile terminal N1 changes according to the above-mentioned location information, and the home location register 15 updates and stores the location information of the mobile terminal N1 according to the above-mentioned current location information and state information of the mobile terminal N1;

S4034. the calling and data services of the mobile terminal are set to use the virtual SIM card; specifically, the mobile terminal N1 registers and activates the virtual SIM card in the roaming country A; after the virtual SIM card is activated, the virtual SIM card may be set to a calling mode or a called mode by the virtual SIM card management software, and the mobile terminal N1 displays no roaming identifier; in addition, the real SIM card is not activated, is in a standby state and will not initiate a call; only when the real SIM card receives a called request, a roaming call identifier is displayed on the mobile terminal N1 to prompt the user that the called request belongs to a roaming call and roaming charges need to be paid.

S404. the mobile terminal sets up a calling or called communication connection of the virtual SIM card with another mobile terminal.

In the embodiment of the present invention, the virtual SIM card of the mobile terminal N1 has been activated and may be used as a calling party or a called party to set up the communication connection with another mobile terminal through the communication network. Since the virtual SIM card carries a corresponding mobile terminal number of the roaming region, the mobile terminal N1 will not display the roaming call identifier no matter serving as the calling party or the called party. Due to the virtual SIM card obtained on the basis of the application, the user does not need to purchase a new SIM card in the roaming region, so that the charges for purchasing the SIM card are saved. Moreover, the purpose of localized roaming of the mobile terminal N1 is achieved and accordingly the roaming call charges are saved.

S405. the mobile terminal sets up a called communication connection of the real SIM card with another mobile terminal.

In the embodiment of the present invention, the real SIM card of the mobile terminal N1 is not activated and is in a standby called state, namely, the real SIM card will not initiate a call. When the real SIM card is called, a roaming call identifier (for example, a letter R) will be displayed on the mobile terminal N1 to prompt the user that the called action belongs to a roaming call and roaming charges need to be paid if answering the call, and then the user selects whether to answer the called request according to demand.

Figure 7:
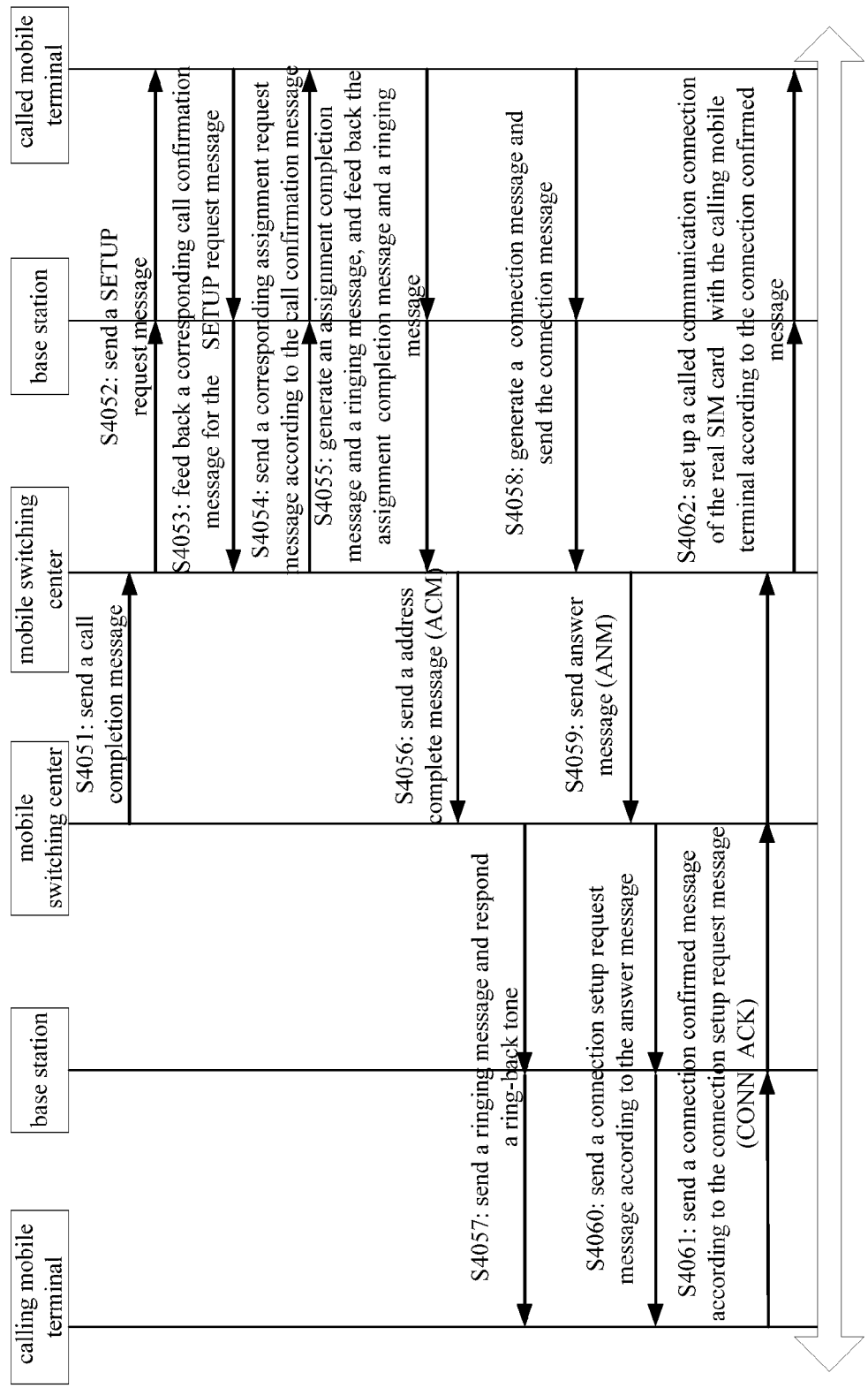
FIG. 7 is a schematic diagram of a sub-flow of a step S405 in FIG. 4.

Further referring to FIG. 7, the step in which the mobile terminal sets up a called communication connection of the real SIM card with another mobile terminal at least includes:

S4051. a mobile switching center of the roaming region receives a call request; specifically a mobile switching center 22 of the roaming country A receives the call request from the visit location register 24, and the call request may aim at the virtual SIM card or the real SIM card of the mobile terminal N1;

S4052. the mobile switching center of the roaming region sends request information; specifically, according to the above-mentioned call request, the mobile switching center 22 sends SETUP request information to a base station controller 212 of a base station 21, a base transceiver station 211 forwards the SETUP information to the mobile terminal N1, and the request information includes the service type of the request and a calling number; in the embodiment of the present invention, to distinguish whether the call aims at the real SIM card or the virtual SIM card, a field may be added in the SETUP request information and the field is used for filling in a real SIM card number or a virtual SIM card number. If the SETUP request information received by the mobile terminal N1 is the real SIM card number, the roaming call identifier is displayed on the screen of the mobile terminal N1; otherwise, the roaming call identifier will not be displayed;

S4053. the mobile terminal sends a call confirmation message; specifically, the mobile terminal N1 receives the SETUP request information and feeds back a corresponding call confirmation message, and the call confirmation message is sent to the mobile switching center 22 via the base transceiver station 211 and the base station controller 212;

S4054. the mobile switching center sends an assignment request message; specifically, according to the above-mentioned call confirmation message, the mobile switching center 22 selects a corresponding interface circuit (for example, an A interface circuit) and sends the corresponding assignment request message to the base station controller 212, and the base station controller 212 allocates a corresponding wireless resource according to a resource condition and notifies the mobile terminal N1 of the information of the allocated wireless resource through the base transceiver station 211;

S4055. the mobile terminal feeds back an assignment completion message and a ringing message; specifically, the mobile terminal N1 receives the notification of the wireless resource allocated by the base station controller 212 and generates the assignment completion message after successfully occupying the allocated wireless resource; meanwhile the called mobile terminal N1 starts to ring and generates a ringing message, and the assignment completion message and the ringing message are sent to the mobile switching center 22 through the base transceiver station 211 and the base station controller 212;

S4056. the mobile switching center sends an address complete message to the mobile switching center where the calling party is located; specifically, the mobile switching center 22 of the roaming country A receives the assignment completion message and the ringing message and sends the address complete message (Address Complete Message, ACM) to the mobile switching center 13 where a mobile terminal N2 initiating the call is located (it is assumed that the mobile terminal N2 initiating the call is located in the home country B);

S4057. the mobile switching center sends the ringing message to the calling mobile terminal; specifically, the mobile switching center 13 of the home country B sends the ringing message fed back by the called mobile terminal N1 to the mobile terminal N2 which initiates the call, and then, the mobile terminal N2 which initiates the call may receive it and output a corresponding ring-back tone;

S4058. the called mobile terminal sends a connection message to the mobile switching center; specifically, if determining to answer the call, the mobile terminal user of the roaming country A presses or triggers a real answer button or a soft virtual key of the called mobile terminal N1 to generate a corresponding connection message, and the mobile terminal N1 sends the connection message to the mobile switching center 22 of the roaming country A;

S4059. the mobile switching center sends an answer message to the mobile switching center where the calling party is located; specifically, the mobile switching center 22 of the roaming country A receives the connection message sent by the called mobile terminal N1 and sends the answer message (Answer Message, ANM) to the mobile switching center 13 where the mobile terminal N2 initiating the call is located (it is assumed herein that the mobile terminal N2 which initiates the call is located in the home country B);

S4060. the mobile switching center sends a connection setup request message to the calling mobile terminal; specifically, after receiving the answer message, the mobile switching center 13 of the home country B sends a corresponding connection setup request message to the calling mobile terminal N2 (namely the mobile terminal N2 which initiates the call);

S4061. the calling mobile terminal sends a connection confirmation message to the mobile switching center; specifically, after receiving the connection setup request message, the calling mobile terminal N2 of the home country B sends a corresponding connection confirmation message to the mobile switching center 13;

S4062. the called mobile terminal sets up a called communication connection of the real SIM card with the calling mobile terminal; specifically, the mobile switching center 13 of the home country B receives the connection confirmation message and forwards the connection confirmation message to the mobile switching center 22 of the roaming country A, and the mobile switching center 22 sends the connection confirmation message to the called mobile terminal N1 of the roaming country A through the base station controller 212 and the base transceiver station 211, so that the real SIM card of the called mobile terminal N1 sets up a communication connection with the calling mobile terminal N2.

In the embodiment of the present invention, after registering in the roaming country A and normally accessing the network, the mobile terminal N1 applies for the corresponding virtual SIM card from the network operator of the roaming country A through the virtual SIM card management software, and the virtual SIM card management software executes relevant operation and management on the virtual SIM card, for example, downloading, activation, suspension, etc. The existing form of the virtual SIM card may be a part of the real SIM card in the mobile terminal (namely, the virtual SIM card may be registered in the real SIM card), or is used as a data file to be directly stored in the external memory (for example, the SD card of the mobile terminal). The virtual SIM card stores an international mobile subscriber identification number (IMSI), an authentication key (KI), a location area identity (LAI), a temporary mobile subscriber identity (TMSI), a personal identification number (PIN), a PIN unlocking key (PUK) and the mobile terminal number of the roaming region, etc.

In other embodiments, the method for achieving the localized roaming of the mobile terminal further includes: the home location register 15 of the home country B of the mobile terminal N1 judges whether the mobile terminal leaves the original roaming country A; when the user of the mobile terminal N1 leaves the roaming country A and enters other countries, the home location register 15 of the home country B of the mobile terminal N1 notifies the roaming number manager 16 that the location of the user of the mobile terminal N1 changes and the user leaves the roaming country A, then the roaming number manager 16 releases the roaming number of the roaming country A occupied by the mobile terminal N1 and terminates the corresponding relationship between the roaming number and the user. In addition, to prevent user number conflict caused by dynamic number allocation, the released number may be unavailable within a certain period of time, and the roaming number may be re-allocated to a user of the mobile terminal N1 after this period of time.

If a certain mobile terminal user often commutes between the home country and a certain roaming country and needs to own the number of the country for a long time, a bound number may be allocated to the mobile terminal user from the available numbers of the roaming country, and the bound number may not be allocated to other roaming users. Even if the mobile terminal user leaves the roaming country, the corresponding relationship between the number and the user is stilled maintained without being terminated. When the mobile terminal user roams to the country, the mobile terminal user is allowed to use the bound number to process call communication. When the mobile terminal user does not need the bound number anymore, the number may be unbound and reused after being recycled. It may be understood that numbers of multiple roaming countries may be bound to one mobile terminal user. If a call initiator dials one bound number of the called roaming user, the home location register of the home country inquires the roaming number manager to obtain the mobile terminal user corresponding to the bound number, finds out the record of the mobile terminal user and obtains the location information of the mobile terminal user to complete routing inquiry. Therefore, if the called mobile terminal has a bound number, the call initiator may have a variety of options for dialing manners: the home country number of the called user (namely the number of the real SIM card), the roaming number of the current roaming country (namely the number of the virtual SIM card) or the bound number.

Figure 8:
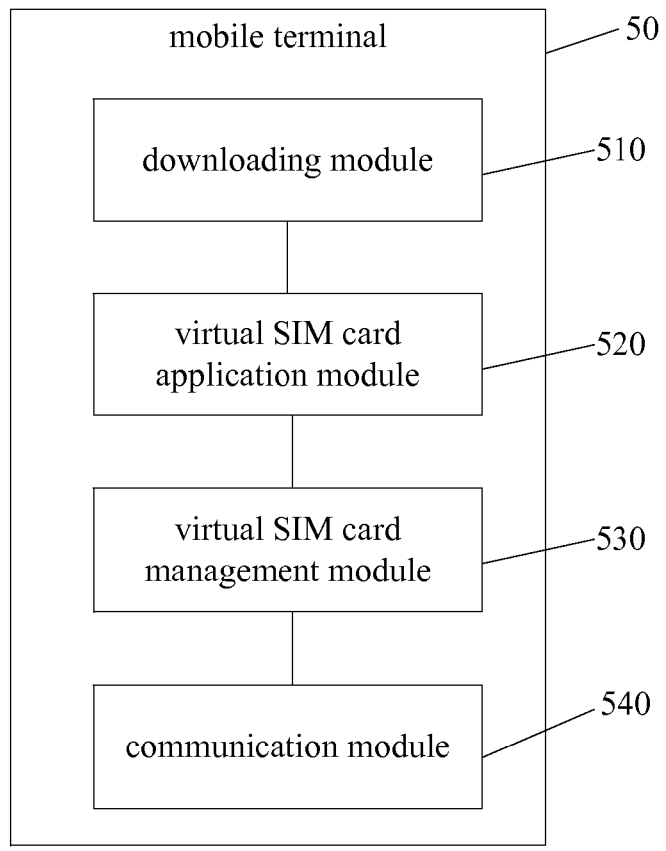
FIG. 8 is a schematic diagram of a mobile terminal provided by an embodiment of the present invention.

Referring to FIG. 8 in combination with the application environment in FIG. 1 and FIG. 2, an embodiment of the present invention provides a mobile terminal 50. The mobile terminal 50 includes a downloading module 510, a virtual SIM card application module 520, a virtual SIM card management module 530 and a communication module 540.

The downloading module 510 is configured to download and install virtual SIM card management software.

In the embodiment of the present invention, after registering in a roaming country A and normally accessing a network, mobile terminal N1 downloads virtual SIM card management software from for example an operator website in a communication network 20 of a roaming country A through the downloading module 510, and installs the virtual SIM card management software on the mobile terminal N1 according to prompt information. The virtual SIM card management software may be downloaded and installed in the real SIM card as an application program, or is directly used as a data file to be stored in an external memory (for example, an SD card) of the mobile terminal N1.

The virtual SIM card application module 520 is configured to send real SIM card information to the communication network to apply for a virtual SIM card to obtain a corresponding mobile terminal number of a roaming region.

In the embodiment of the present invention, after the mobile terminal N1 registers in the roaming country A and normally accesses the network, the virtual SIM card application module 520 sends real SIM card information through a virtual SIM card server 23 of the roaming country A to apply for the corresponding virtual SIM card, and the virtual SIM card management software executes relevant operation and management on the virtual SIM card, for example, downloading, activation, suspension, etc. The virtual SIM card may be a part of a real SIM card in the mobile terminal (namely, the virtual SIM card may be registered in the real SIM card), or is used as a data file to be directly stored in an external memory of the mobile terminal N1 (for example, the SD card of the mobile terminal N1). The virtual SIM card stores an international mobile subscriber identification number (IMSI), an authentication key (KI), a location area identity (LAI), a temporary mobile subscriber identity (TMSI), a personal identification number (PIN), a PIN unlocking key (PUK) and the mobile terminal number of the roaming region, etc.

In the embodiment of the present invention, the virtual SIM card application module 520 is further configured to set up the communication connection with the virtual SIM card server 23 of the communication network of the roaming country A, send application information carrying the real SIM card information to apply for and obtain the virtual SIM card from the virtual SIM card server 23, receive applicant identity verification of the virtual SIM card server 23 to obtain a corresponding virtual SIM card, and store the virtual SIM card information.

The virtual SIM card management module 530 is configured to register user information in the communication network to activate the virtual SIM card to serve as a calling party or a called party.

In the embodiment of the present invention, the mobile terminal N1 registers the user information of the mobile terminal N1 in the network operator of the roaming country A through the virtual SIM card management module 520, and after the authentication of the individual information of the mobile terminal user is passed, the virtual SIM card is activated. At this time, the virtual SIM card may be used as the calling party or the called party, the real SIM card is not activated, the mobile terminal N1 displays no roaming information, and the real SIM card is in a standby state and will not initiate any calling action. Wherein the registration information of the mobile terminal N1 may not only provide the virtual SIM card information and may also carry the real SIM card information. When the virtual SIM card is activated, the real SIM card information is loaded in the communication network 20 of the roaming country A, the communication network 20 of the roaming country A stores the updated location information of the mobile terminal N1 and sends the updated location information to the communication network 10 of the home country B of the mobile terminal N1.

In the embodiment of the present invention, the virtual SIM card management module 530 is further configured to activate the virtual SIM card and close the roaming information of the real SIM card of the mobile terminal, to enable the visit location register 24 of the roaming region to obtain the virtual SIM card information and the real SIM card information of the mobile terminal N1 from the virtual SIM card server 23, and send the location information and the state information of the real SIM card to a home location register 15 through the visit location register 24 according to the real SIM card information of the mobile terminal and store the location information and the state information of the real SIM card, and set the calling and data services of the mobile terminal N1 to use the virtual SIM card.

The communication module 540 is configured to set up the calling or called communication connection of the virtual SIM card.

In the embodiment of the present invention, the virtual SIM card of the mobile terminal N1 has been activated and may be used as a calling party or a called party to set up a communication connection with other mobile terminals (including a local mobile terminal and a remote mobile terminal) through the communication module 530. Since the mobile terminal N1 carries a corresponding mobile terminal number of the roaming region, the mobile terminal N1 will not display the roaming call identifier no matter serving as the calling party or the called party. Due to the virtual SIM card obtained on the basis of the application and the carried mobile terminal number of the roaming region, the mobile terminal user does not need to purchase a new SIM card in the roaming region, so that the charges of purchasing the SIM card are saved.

In some embodiments of the present invention, the communication module 540 is further configured to set up a called communication connection of the real SIM card.

In the embodiment of the present invention, since the real SIM card of the mobile terminal N1 is not activated and is in a standby called state, namely, the real SIM card will not initiate any calling action. When the mobile terminal N1 is used as the called party to set up the communication connection with other mobile terminals through the communication module 530, a roaming call identifier will be displayed on the mobile terminal N1 to prompt the user that the called action belongs to a roaming call and roaming charges need to be paid, and then the user selects whether to answer the called request according to demand.

For example, the mobile terminal 50 in the embodiment may be a mobile phone, a phone call tablet, etc.

It may be understood that, functions of the functional modules of the mobile terminal 50 in the embodiment may be specifically implemented according to the methods in the above-mentioned first to second method embodiments, and the specific implementation process may refer to relevant descriptions in the above-mentioned first to second method embodiments, which will not be repeated redundantly herein.

The mobile terminal in the embodiment of the present invention applies for a virtual SIM card from the communication network of the roaming country to be allocated and obtain a corresponding mobile terminal number of the roaming region, and then registers user information in the roaming country to activate the virtual SIM card, so as to keep the virtual SIM card in a calling or called state. Therefore, the user does not need to purchase a new SIM card in the roaming region, thereby saving the charges for purchasing the SIM card, facilitating operation and satisfying the demand of the user. In addition, the mobile terminal updates location information of a home country real SIM card to the home country so as to keep the home country real SIM card in a called state. Therefore, when the real SIM card receives a called request, a roaming call identifier will be displayed on the mobile terminal to prompt the user that the called request belongs to a roaming call and roaming charges need to be paid, and then the user selects whether to answer the called request according to demand, so as to reduce the roaming call charges without missing calls or short messages.

In addition, if a certain mobile terminal user often commutes between the home country and a certain roaming country and needs to own the number in the country for a long time, a bound number may be allocated to the mobile terminal user from the available numbers of the roaming country, and the bound number may not be allocated to other roaming users. Even if the mobile terminal user leaves the roaming country, the corresponding relationship between the number and the user is stilled maintained without being terminated. When the mobile terminal user roams to the country, the mobile terminal user is allowed to use the bound number to process call communication. When the mobile terminal user does not need the bound number anymore, the number may be unbound and may be reused after being recycled. It may be understood that numbers of multiple roaming countries may be bound to one mobile terminal user. If a call initiator dials one bound number of the called roaming user, the home location register of the home country inquires the roaming number manager to obtain the mobile terminal user corresponding to the bound number, finds out the record of the mobile terminal user and obtains the location information of the mobile terminal user to complete routing inquiry. Therefore, if the called mobile terminal has a bound number, the call initiator may have a variety of options for dialing manners: the home country number of the called user (namely the number of the real SIM card), the roaming number of the current roaming country (namely the number of the virtual SIM card) or the bound number.

The embodiment of the present invention further provides a computer storage medium, wherein the computer storage medium stores a program, and when being executed, the program includes a part of or all of the steps of the data processing method recorded in the above-mentioned first to second method embodiments.

Figure 9:
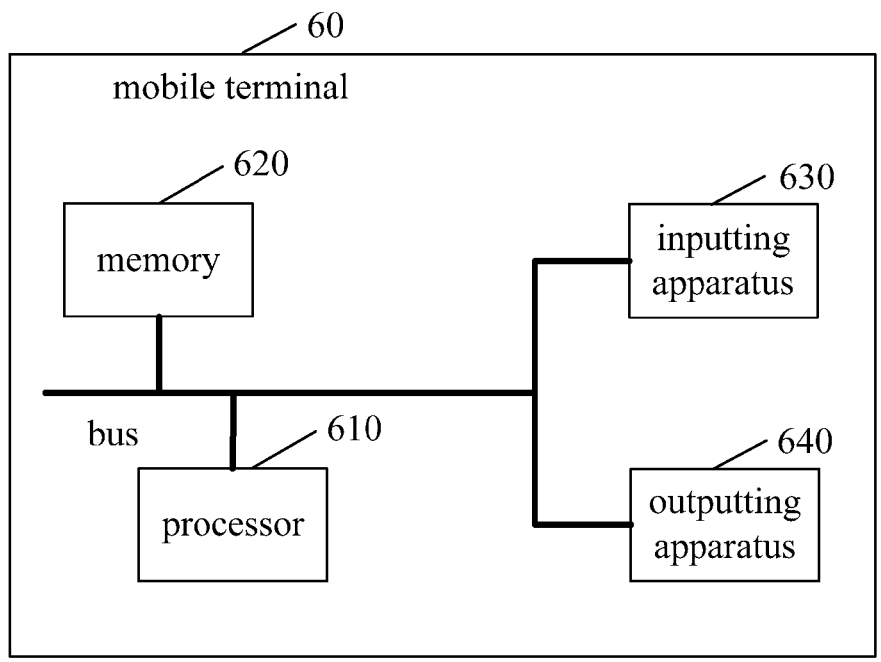
FIG. 9 is a schematic diagram of another mobile terminal provided by an embodiment of the present invention.

Referring to FIG. 9, the embodiment of the present invention further provides a mobile terminal 60, including a processor 610, a memory 620, an inputting apparatus 630 and an outputting apparatus 640 (the number of the processors 60 in the mobile terminal 60 may be one or more, and one processor 610 is taken as an example for illustration in FIG. 9). In some embodiments of the present invention, the inputting apparatus 630, the outputting apparatus 640, the memory 620 and the processor 610 may be connected via buses or in other manners, wherein bus connection is taken as an example in FIG. 9.

The processor 610 executes the following steps:
 downloading and installing virtual SIM card management software;
 sending real SIM card information to a communication network to apply for a virtual SIM card to obtain a corresponding mobile terminal number of a roaming region;
 registering user information in the communication network to activate the virtual SIM card to serve as a calling party or a called party;
 setting up a calling or called communication connection of the virtual SIM card; and
 setting up a called communication connection of a real SIM card.

In some embodiments of the present invention, when executing the step of sending real SIM card information to a communication network to apply for a virtual SIM card to obtain a corresponding mobile terminal number of a roaming region, the processor 610 specifically executes the following steps:
 setting up a communication connection with a virtual SIM card server of the communication network of a roaming country;
 sending application information carrying real SIM card information to the virtual SIM card server to obtain the virtual SIM card from the virtual SIM card server;
 receiving applicant identity verification of the virtual SIM card server;
 obtaining a corresponding virtual SIM card; and
 storing the virtual SIM card information.

In some embodiments of the present invention, when executing the step of registering user information in the communication network to activate the virtual SIM card to serve as a calling party or a called party, the processor 610 specifically executes the following steps:
 activating the virtual SIM card and closing roaming information of the real SIM card of the mobile terminal, to enable a visit location register of the roaming region to obtain virtual SIM card information and the real SIM card information of the mobile terminal from the virtual SIM card server, and to send location information and state information of the real SIM card according to the real SIM card information of the mobile terminal to a home location register, which stores the location information and the state information of the real SIM card; and
 setting calling and data services of the mobile terminal to use the virtual SIM card.

In the embodiment of the present invention, the virtual SIM card may be used as a part of the real SIM card in the mobile terminal, or is used as a data file to be directly stored in an external memory of the mobile terminal. When the real SIM card is used in a called state, a roaming call identifier is displayed on the mobile terminal.

For example, the mobile terminal 60 in the embodiment may be a mobile phone, a phone call tablet, etc.

It may be understood that, functions of the functional modules of the mobile terminal 60 in the embodiment may be specifically implemented by the methods in the above-mentioned first and second method embodiments, and the specific implementation process may refer to relevant descriptions in the above-mentioned first and second method embodiments, which will not be repeated redundantly herein.

In addition, if a certain mobile terminal user often commutes between the home country and a certain roaming country and needs to own the number of the country for a long time, a bound number may be allocated to the mobile terminal user from the available numbers of the roaming country, and the bound number may not be allocated to other roaming users. Even if the mobile terminal user leaves the roaming country, the corresponding relationship between the number and the user is stilled maintained without being terminated. When the mobile terminal user roams to the country, the mobile terminal user is allowed to use the bound number to process call communication. When the mobile terminal user does not need the bound number anymore, the number may be unbound and may be reused after being recycled. It may be understood that numbers of multiple roaming countries may be bound to one mobile terminal user. If a call initiator dials one bound number of the called roaming user, the home location register of the home country inquires the roaming number manager to obtain the mobile terminal user corresponding to the bound number, finds out the record of the mobile terminal user and obtains the location information of the mobile terminal user to complete routing inquiry. Therefore, if the called mobile terminal has a bound number, the call initiator may have a variety of options for dialing manners: the home country number of the called user (namely the number of the real SIM card), the roaming number of the current roaming country (namely the number of the virtual SIM card) or the bound number.

It should be noted that, for simple description, the foregoing method embodiments are expressed as a series of action combinations, but those skilled in the art should be aware that the present invention is not limited to the described action sequence, because according to the present invention, some steps may be implemented in other sequences or simultaneously. Next, those skilled in the art should also be aware that the embodiments described in the description all belong to preferred embodiments and the involved actions and modules are not necessarily required by the present invention.

In the above-mentioned embodiments, descriptions to the embodiments have different emphases, and if no detailed description of a part of a certain embodiment is given, reference may be made to relevant descriptions of other embodiments.

To sum up, the mobile terminal in the embodiment of the present invention applies for a virtual SIM card from the communication network of the roaming country to be allocated and obtain a corresponding mobile terminal number of the roaming region, and then registers the user information in the roaming country to activate the virtual SIM card, so as to keep the virtual SIM card in a calling or called state. Therefore, the user does not need to purchase a new SIM card in the roaming region, thereby saving the charges for purchasing the SIM card, facilitating operation and satisfying the demand of the user. In addition, the mobile terminal updates location information of the home country real SIM card to the home country so as to keep a home country real SIM card in a called state. Therefore, when the real SIM card receives a called request, a roaming call identifier will be displayed on the mobile terminal to prompt the user that the called request belongs to a roaming call and roaming charges need to be paid, and then the user selects whether to answer the called request according to demand, so as to reduce the roaming call charges without missing calls or short messages.

Those of ordinary skill in the art may understand that all of or a part of the steps of the methods in the above-mentioned embodiments may be implemented by a program instructing relevant hardware, the program may be stored in a computer readable storage medium, and the storage medium may include: for example, a read-only memory, a random access memory, a magnetic disk, an optical disk or the like.

The foregoing descriptions are detailed introductions to the method and the relevant apparatus for achieving the localized roaming of the mobile terminal provided by the embodiments of the present invention, the principle and the implementations of the present invention are illustrated in this paper by utilizing specific examples, and the description of the above-mentioned embodiments is merely used for helping to understand the method of the present invention and the core concept thereof; meanwhile, those of ordinary skill in the art may make modifications to specific implementations and the application range in accordance with the concept of the present invention. To sum up, the contents in the description should not be construed as limiting the present invention.

What is claimed is:

1. A method for setting up a communication connection, comprising:

downloading and installing, by a mobile terminal, virtual Subscriber Identity Module (SIM) card management software for executing operation and management of a virtual SIM card;

sending, by the mobile terminal, real SIM card information to apply for the virtual SIM card to obtain a corresponding mobile terminal number for use in a roaming region through the virtual SIM card management software, wherein the corresponding mobile terminal number is allocated to the mobile terminal by a network operator in the roaming region and provided to the mobile terminal from the network operator in the roaming region;

registering user information to activate the virtual SIM card to serve as one of a calling party and a called party; and setting up a called communication connection of a real SIM card, wherein the sending real SIM card information to apply for a virtual SIM card to obtain a corresponding mobile terminal number for use in a roaming region comprises:

setting up a communication connection with a virtual SIM card server of a communication network of a roaming country;

sending application information carrying the real SIM card information to obtain the virtual SIM card from the virtual SIM card server;

passing applicant identity verification performed by the virtual SIM card server;

obtaining a corresponding virtual SIM card; and storing information of the virtual SIM card;

wherein the registering user information to activate the virtual SIM card to serve as one of a calling party and a called party comprises:

activating the virtual SIM card and closing roaming information of the real SIM card of the mobile terminal, to enable a visit location register of the roaming region to obtain virtual SIM card information and the real SIM card information of the mobile terminal from the virtual SIM card server, wherein location information and state information of the real SIM card is sent by the visit location register according to the real SIM card information of the mobile terminal to a home location register which stores the location information and the state information of the real SIM card; and setting calling and data services of the mobile terminal to use the virtual SIM card;

wherein the setting up a called communication connection of a real SIM card comprises: receiving, by the mobile terminal, an assignment request message sent by a mobile switching center from a base station; and sending, by the mobile terminal, an assignment completion message and a ringing message to the mobile switching center through the base station, for enabling the mobile switching center to send an address complete message to a mobile switching center where a calling party is located, wherein the ringing message is sent by the mobile switching center where the calling party is located to a mobile terminal of the calling party.

2. The method for setting up a communication connection of claim 1, wherein after the registering user information to activate the virtual SIM card to serve as one of a calling party and a called party, the method comprises:

setting up one of a calling communication connection and a called communication connection of the virtual SIM card.

3. The method for setting up a communication connection of claim 1, wherein the setting up a called communication connection of a real SIM card further comprises:

receiving, by the mobile terminal, a call request of a visit location register from the base station;

sending, by the mobile terminal, a corresponding call confirmation message to the mobile switching center through the base station;

sending, by the mobile terminal, a connection message to the mobile switching center through the base station, for enabling the mobile switching center to send an answer message to the mobile switching center where the calling party is located, wherein a connection setup request message is sent by the mobile switching center where the calling party is located to the mobile terminal of the calling party, and a connection confirmation message is sent by the mobile terminal of the calling party to the mobile switching center where the called party is located through the mobile switching center where the calling party is located; and receiving, by the mobile terminal, the connection confirmation message from the base station, and setting up the called communication connection of the real SIM card with the mobile terminal of the calling party.

4. The method for setting up a communication connection of claim 3, wherein when the real SIM card is in a called state, a roaming call identifier is displayed on the mobile terminal.

5. The method for setting up a communication connection of claim 1, wherein the virtual SIM card is used as one of a part of the real SIM card in the mobile terminal and a data file to be directly stored in an external memory of the mobile terminal.

6. The method for setting up a communication connection of claim 1, wherein when the real SIM card is in a called state, a roaming call identifier is displayed on the mobile terminal.

7. The method for setting up a communication connection of claim 1, wherein when the mobile terminal leaves the roaming region, the mobile terminal number for use in a roaming region of a roaming country occupied by the mobile terminal is released, and a corresponding relationship between the mobile terminal number of the roaming region and a user is terminated.

8. A mobile terminal, comprising: an inputting apparatus, an outputting apparatus, a memory and a processor, wherein the inputting apparatus, the outputting apparatus, the memory and the processor are interconnected, wherein the processor executes the following steps:

downloading and installing virtual Subscriber Identity Module (SIM) card management software for executing operation and management of a virtual SIM card;

sending real SIM card information to apply for the virtual SIM card to obtain a corresponding mobile terminal number for use in a roaming region through the virtual SIM card management software, wherein the corresponding mobile terminal number is allocated to the mobile terminal by a network operator in the roaming region;

receiving the corresponding mobile terminal number from the network operator in the roaming region;

registering user information to activate the virtual SIM card to serve as one of a calling party and a called party; and setting up a called communication connection of a real SIM card, wherein when executing the step of sending real SIM card information to apply for a virtual SIM card to obtain a corresponding mobile terminal number for use in a roaming region, the processor executes the following steps:

setting up a communication connection with a virtual SIM card server of a communication network of a roaming country;

sending application information carrying the real SIM card information to obtain the virtual SIM card from the virtual SIM card server;

passing applicant identity verification performed by the virtual SIM card server;

obtaining a corresponding virtual SIM card; and storing information of the virtual SIM card;

wherein when executing the step of registering user information to activate the virtual SIM card to serve as one of a calling party and a called party, the processor executes the following steps:

activating the virtual SIM card and closing roaming information of the real SIM card of the mobile terminal, to enable a visit location register of the roaming region to obtain virtual SIM card information and the real SIM card information of the mobile terminal from the virtual SIM card server, wherein location information and state information of the real SIM card is sent by the visit location register according to the real SIM card information of the mobile terminal to a home location register which stores the location information and the state information of the real SIM card; and setting calling and data services of the mobile terminal to use the virtual SIM card;

wherein the processor further executes the following steps:

receiving, by the mobile terminal, an assignment request message sent by the mobile switching center from the base station; and sending, by the mobile terminal, an assignment completion message and a ringing message to the mobile switching center through the base station, for enabling the mobile switching center to send an address complete message to a mobile switching center where a calling party is located, wherein the ringing message is sent by the mobile switching center where the calling party is located to a mobile terminal of the calling party.

9. The mobile terminal of claim 8, wherein the processor further executes the following step:

setting up one of a calling communication connection and called communication connection of the virtual SIM card.

10. The mobile terminal of claim 8, wherein the processor further executes the following steps:

receiving, by the mobile terminal, a call request of a visit location register from the base station;

sending, by the mobile terminal, a corresponding call confirmation message to the mobile switching center through the base station;

sending, by the mobile terminal, a connection message to the mobile switching center through the base station, for enabling the mobile switching center to send an answer message to the mobile switching center where the calling party is located, wherein a connection setup request message is sent by the mobile switching center where the calling party is located to the mobile terminal of the calling party, and a connection confirmation message is sent by the mobile terminal of the calling party to the mobile switching center where the called party is located through the mobile switching center where the calling party is located; and receiving, by the mobile terminal, the connection confirmation message from the base station, and setting up the called communication connection of the real SIM card with the mobile terminal of the calling party.

11. The mobile terminal of claim 10, wherein when the real SIM card is in a called state, a roaming call identifier is displayed on the mobile terminal.

12. The mobile terminal of claim 8, wherein an existing form of the virtual SIM card is used as one of a part of the real SIM card in the mobile terminal and a data file to be directly stored in an external memory of the mobile terminal.

13. The mobile terminal of claim 8, wherein when the real SIM card is in a called state, a roaming call identifier is displayed on the mobile terminal.

14. The mobile terminal of claim 8, wherein when the mobile terminal leaves the roaming region, the mobile terminal number for use in a roaming region of a roaming country occupied by the mobile terminal is released, and a corresponding relationship between the mobile terminal number of the roaming region and a user is terminated.

\* \* \* \* \*